United States Patent [19]

Kooymans et al.

[11] Patent Number: 4,593,078

[45] Date of Patent: Jun. 3, 1986

[54] POLYGLYCIDYL ETHERS, THEIR PREPARATION AND THEIR USE IN PREPARING THERMOSETTING COATING COMPOSITIONS

[75] Inventors: Petrus G. Kooymans; Stephen A. Stachowiak; Jurrianus Bekooij; Werner T. Raudenbusch, all of Amsterdam, Netherlands

[73] Assignee: Shell Oil Company, Houston, Tex.

[21] Appl. No.: 609,610

[22] Filed: May 14, 1984

[30] Foreign Application Priority Data

Jun. 3, 1983 [GB] United Kingdom ................. 8315230

[51] Int. Cl.$^4$ ............................................ C08L 63/04
[52] U.S. Cl. .................... 525/497; 204/181.7; 523/404; 523/414; 523/415; 523/416; 524/901; 525/501; 525/504; 525/523; 525/528
[58] Field of Search .............. 525/481, 484, 497, 501, 525/504, 528, 523

[56] References Cited

U.S. PATENT DOCUMENTS

| 3,547,881 | 12/1970 | Mueller et al. | 528/87 |
| 4,066,525 | 1/1978 | Woo et al. | 204/181 |
| 4,119,599 | 10/1978 | Woo et al. | 524/901 |
| 4,246,089 | 1/1981 | Hazen | 204/181 |

Primary Examiner—Theodore E. Pertilla

[57] ABSTRACT

The present invention is directed to polyglycidyl ethers having, on average, n epoxy groups per molecule, where $1 < n \leq 2$, which comprise the reaction products of multifunctional polyglycidyl ethers having, on average, x epoxy groups per molecule, where $x > 2$, with $(x-n)$ mol of monofunctional phenols per mol of the multifunctional polyglycidyl ether and to a process for their preparation and their use in preparing thermosetting coating compositions, particularly for use in electrodeposition coating of articles.

6 Claims, No Drawings

POLYGLYCIDYL ETHERS, THEIR PREPARATION AND THEIR USE IN PREPARING THERMOSETTING COATING COMPOSITIONS

FIELD OF THE INVENTION

This invention relates to polyglycidyl ethers, a process for their preparation and their use in preparing thermosetting coating compositions, particularly for use in electrodeposition coating of articles.

BACKGROUND OF THE INVENTION

U.S. Pat. No. 4,246,089 discloses a glycidyl ether having on average less than one epoxy group per molecule, which is the reaction product of a bisphenol-A-derived diglycidyl ether and an alkyl phenol, e.g., nonyl phenol, in a molar ratio in the range of from 1:1.1 to 1.9; and the use of such a glycidyl ether in preparing a graft copolymer based on an acrylic-amine backbone. Such graft copolymers are disclosed as components of thermosetting coating compositions, e.g., for electrocoating of vehicle bodies by cathodic electrodeposition.

U.S. Pat. No. 4,066,525 discloses the preparation of resinous binder materials containing substantially no residual epoxy groups by reaction of a bisphenol-A-derived diglycidyl ether with a phenol, e.g., nonyl phenol, or with a mixture of a phenol and an amino alcohol, e.g., diethanolamine. The resinous binder materials are used in thermosetting coating compositions for electrocoating of appliances by cathodic electrodeposition.

SUMMARY OF THE INVENTION

The present invention provides a polyglycidyl ether having, on average, n epoxy groups per molecule, where $1 < n \leq 2$, which comprises the reaction product of a multifunctional polyglycidyl ether having, on average, x epoxy groups per molecule, where $x > 2$, with $(x-n)$ mol of a monofunctional phenol per mol of the multifunctional polyglycidyl ether.

The invention also provides a process for preparing a polyglycidyl ether of the invention which process comprises reacting the multifunctional polyglycidyl ether with the monofunctional phenol at a temperature in the range 120° to 180° C. in the presence of an acid or base catalyst.

The invention further provides a process for the preparation of thermosetting resin coating compositions using the present polyglycidyl ethers.

DESCRIPTION OF THE PREFERRED EMBODIMENTS

The multifunctional polyglycidyl ether useful in the present invention may be a polyglycidyl ether prepared by reaction of a polyhydric phenol having a phenolic hydroxyl functionality greater than 2, with an epihalodrin, preferable epichlorohydrin, in the presence of a hydrogen halide acceptor, e.g., an alkali metal hydroxide.

Examples of suitable such polyhydric phenols are novolac resins of general formula

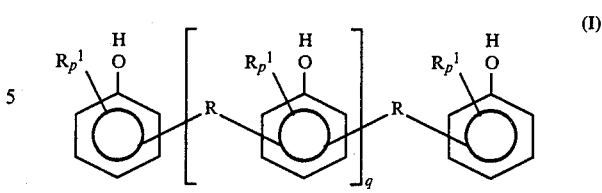

wherein R represents an alkylene, e.g., $CH_2$, group, $R^1$ represents an alkyl group, e.g., methyl, p-t-butyl, octyl or nonyl group, q and p are numbers having average values $0 < q \leq 2$, or of the general formula

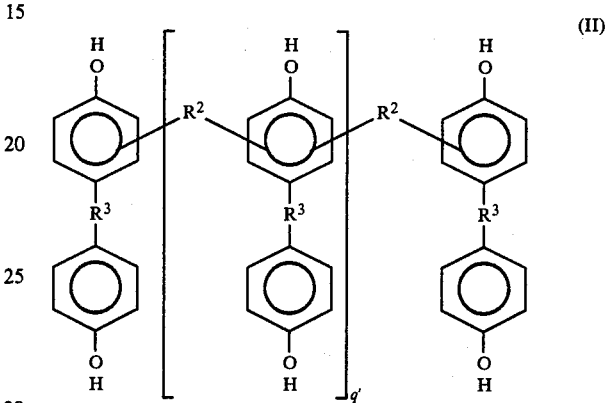

wherein $R^2$ represents an alkylene, e.g., $CH_2$ group, $R^3$ represents an alkylene, e.g., $CH_2$ or $C(CH_3)_2$ group, a carbonyl group, an oxygen or sulfur atom and q' is a number having an average value in the range 0 to 2.

Other examples of suitable polyhydric polynuclear phenols are 1,1-2,2-tetra(4-hydroxyphenyl)ethane and the tetraphenol derived from diphenolic acid having the general formula

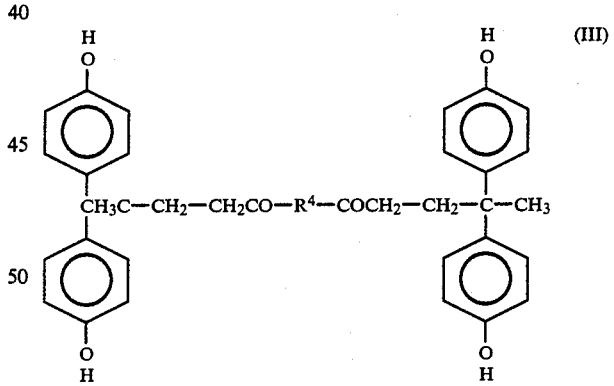

wherein $R^4$ represents the residue of a diol. Polyglycidyl ethers derived from polyhydric phenols of formulae I, II and III are known and are described, together with processes for their preparation, in, for example, U.S. Pat. No. 2,844,553.

Preferably, the multifunctional polyglycidyl ether is an epoxy novolac resin wherein x is greater than 2 and is in the range from about 2 to 6, and more preferably x is in the range from 3 to 4.

Advantageously, the epoxy novolac resin is derived from a novolac of formula I wherein R is $CH_2$, q is 1 to 2 and p is 0 to 1 or a bisphenol novolac of formula II wherein $R^2$ is $CH_2$, $R^3$ is $C(CH_3)_2$ and q' is 0.

Preferably, n is in the range from about 1.3 to 2 and advantageously n is in the range 1.4 to 1.7.

The multifunctional phenol may be a single phenol or a mixture of phenols. For example the phenol may be phenol, optionally substituted by one or more of one or more substituents selected from $C_{1-16}$ alkyl, $C_{3-16}$ alkenyl, $C_{1-4}$ hydroxyalkyl, $C_{2-13}$ alkoxycarbonyl and $C_{1-16}$ alkoxy groups. Examples of such compounds include phenol, the cresols, salicyl alcohol, 2-allyl phenol, 2,4,6-triallyl phenol, dimethyl phenol, 4-hydroxymethyl-2,6-dimethyl phenol, 2-hydroxyphenethyl alcohol, 4-hydroxybenzyl alcohol and ethyl 4-hydroxybenzoate. Preferably the monofunctional phenol is phenol substituted in the para-position by a $C_{4-12}$ alkyl substituent. Examples of such alkyl substituents include n-, iso- and t-butyl, n- and iso-octyl, n- and iso-nonyl and n- and iso-dodecyl groups. Branched alkyl substituents are particularly suitable. P-iso-octyl phenol has been found to be a very suitable monofunctional phenol.

The invention also provides a process for preparing the polyglycidyl ethers of the present invention, which process comprises reacting the multifunctional polyglycidyl ether with the monofunctional phenol at a temperature in the range 120° to 180° C. in the presence of an acid or base catalyst.

Preferably, the reaction is performed at a temperature in the range of from about 130° to about 150° C.

The acid or base catalyst may be, for example, a tertiary amine, a quaternary ammonium or phosphonium salt or an alkali metal hydroxide or carbonate, or sulfuric acid.

The tertiary amine may be, for example, triethanolamine, benzyl dimethylamine or 2-dimethylamino-2-methyl-1-propanol. Quaternary ammonium salts, e.g., tertiary ammonium chloride, are preferred catalysts.

Tertiary amine catalysts are preferably used in amounts from about 0.1% to about 1%w of the reactants and the quaternary ammonium salts are peferably employed in amounts from 0.005 to 0.2%w of reactants.

The invention also includes uses of the polyglycidyl ethers of the present invention. Those skilled in the art will appreciate that they may be used in applications which are conventional (known) uses of polyglycidyl ethers containing on average more than 1 but not more than 2 epoxy groups per molecule.

However, the polyglycidyl ethers of the invention have been found to be particularly useful in the preparation of thermosetting coating compositions. Accordingly the invention further provides a process for the preparation of a thermosetting coating composition which comprises reacting a polyglycidyl ether of the invention in aqueous medium with an amino compound containing on average two amino-hydrogen atoms per molecule or an alkali metal salt of an amino acid at a temperature in the range 100° to 120° C., and combining the resulting resinous compound with a cross-linking compound in a weight ratio of from 95:5 to 65:35 before or after neutralization.

If desired, a quantity of a known liquid or solid diglycidyl ether, such as a liquid or solid bisphenol-A-derived diglycidyl ether, e.g., "EPON ® Resin 828" or "EPON ® Resin 1007" may be included with the polyglycidyl ether of the invention in the reaction in aqueous medium in the above process for the preparation of a thermosetting coating composition.

2-Amino-2-methyl-1-propanol is the preferred amino compound, and its use thereof gives rise to compositions which are suitable for use in cathodic electrodeposition coating. Glycine, neutralized, for example, with potassium hydroxide, is a preferred amino acid, and the use of amino acids gives rise to compositions which are suitable for use in anodic electrodeposition. Accordingly, the invention also comprises use of a thermosetting coating composition prepared by the process defined above, in the electrodeposition coating of articles.

Preferred cross-linking compounds, for addition to the resinous compounds before or after neutralization are water-soluble, cross-linking agents of the aminoplast type, such as alkoxylated reaction products or formaldehyde with melamine or benzoguanamine.

Other cross-linking agents include urea-formaldehyde resins, phenolformaldehyde resins, and blocked polyisocyanates. The weight ratios of the resinous compound and the cross-linking agent are preferably in the range 80:20 to 70:30.

Pigments, fillers, dispersing agents, and other components known in the art of paint formulation may further be added. Addition of small amounts (up to 1%w) of non-ionic surfactant may be useful for further stabilization of aqueous compositions or improvement of the wetting during application. The water for use in the aqueous compositions is preferably purified, such as by distillation or demineralization. The water-dilutable compositions may be applied by a variety of methods known in the art, onto a variety of substrates, in particular, metals such as bare steel, phosphated steel, chromate-treated steel, zinc, tin plate (for can coating), and aluminum, to produce cured coatings of desirable thickness, from 2 micrometers upwards up to in general 40 micrometers.

Curing can be performed by stoving, for example, at temperatures from 150° to 220° C., with curing times varying from 2 to 30 minutes.

The neutralized resinous compounds may be applied by electrodeposition and other methods such as spraying or dipping, and are particularly suitable for coating cans by electrodeposition. Those skilled in the art will appreciate the need to select compounds which are approvable by regulatory authorities when food or beverage cans are to be coated.

The invention will be further illustrated by the following illustrative examples, in which parts are by weight, unless otherwise indicated, and various terms are defined as follows:

"Multifunctional polyether A" is a semi-solid multifunctional epoxy novolac resin of average molecular weight 680 g, containing on average 3.5 epoxy groups per molecule, "AV" is acid value, expressed in mg KOH/g, "Amine value" is expressed in milli-equivalents per gram, and "CYMEL 1141" (trade mark) is a highly alkylated melamineformaldehyde curing resin containing methoxy and isobutoxy substituents and acidic chelating groups, 85% solids in isobutanol, AV $22\pm3$ mg KOH/g.

EXAMPLE 1

Multifunctional polyether A (680 g, 1 mol, 3.5 epoxy equivalents) and p-iso-octylphenol (412 g, 2 mol) were heated with stirring to 140° C. When the mixture was homogeneous, a 50% aqueous solution of tetramethylammonium chloride (0.55 g) was added and the mixture was maintained at 140° C. until reaction was complete (4 hours). The product was thinned with 2-n-butoxyethanol (546 g) and cooled to ambient temperature (20° C.). The resulting solution contained 66.7% solids, the desired polyether product having average molecular weight 1092 and an epoxy content of 1.37 meq./g solids (average of 1.5 epoxy groups per molecule).

EXAMPLE 2

Multifunctional polyether (680 g, 1 mol, 3.5 epoxy equivalents) and p-iso-octylphenol (309 g, 1.5 mol) were heated with stirring to 140° C. When the mixture was homogeneous, a 50% aqueous solution of tetramethylammonium chloride (0.55 g) was added and the mixture was maintained at 140° C. for 4 hours, until reaction was complete. Dilution with 2-n-butoxyethanol (495 g) and cooling to ambient temperature gave a solution containing 66.7% solids, the desired product having average molecular weight 989 and an epoxy content of 2.02 meq./g solids (average of 2 epoxy groups per molecule).

EXAMPLE 3

Multifunctional polyether B (732 g, 1 mol, 3.5 epoxy equivalents) and p-iso-octylphenol (412 g, 2 mol) were heated with stirring to 140° C. When the picture was homogeneous a 50% aqueous solution of tetramethylammonium chloride (0.55 g) was added and the mixture was maintained at 140° C. for 4 hours, until reaction was complete. Dilution with 2-n-butoxyethanol (572 g) and cooling to ambient temperature gave a solution of the desired product (solids content 66.7%), which had average molecular weight 1144 and an epoxy content of 1.31 meq./g solids (average of 1.5 epoxy groups per molecule).

EXAMPLE 4

Multifunctional polyether B (732 g, 1 mol, 3.5 epoxy equivalents) and p-iso-octylphenol (309 g, 1.5 mol) were heated with stirring to 140° C. When the mixture was homogeneous, a 50% aqueous solution of tetramethylammonium chloride was added and the mixture was maintained at 140° C. for 4 hours, until reaction was complete. The mixture was then diluted with 2-n-butoxyethanol (520 g) and the resulting solution of the desired product (solids content 66.7%) was cooled to ambient temperature. The product had average molecular weight 1041 and an epoxy content of 1.92 meq./g solids (average of 2 epoxy groups per molecule).

EXAMPLE 5

Preparation of adduct for use as cathodic electrodeposition binder

A 95% aqueous solution of 2-amino-2-methyl-1-propanol (93.7 g, 1 mol) and water (50 g) were heated with stirring to 100° C. The resulting solution of Example 1 was added over 2 hours, with stirring, while the temperature was maintained at 100° to 110° C. After addition was complete, the mixture was kept at 100° to 120° C. with stirring for a further 8 hours, until reaction was complete (amine value 0.85, on solids).

EXAMPLE 6

Preparation of adduct for use as cathodic electrodeposition binder

A 95% aqueous solution of 2-amino-2-methyl-1-propanol (93.7 g, 1 mol) and water (40 g) were heated with stirring to 100° C. The resulting solution of Example 3 was added over 2 hours, with stirring, while the temperature was maintained at 100° to 110° C. The mixture was kept for a further 8 hours at 100° to 120° C. with stirring, until reaction was complete (amine value 0.81, on solids).

EXAMPLE 7

Preparation of adduct for use as anodic electrodeposition binder

Glycine (56.25 g, 0.75 mol), water (187.5 g) and potassium hydroxide (48.5 g, 0.75 mol) were heated with stirring to 100° C. The polyether product of Example 1 (1638.55 g of a 66.7% solution in 2-n-butoxyethanol, 1 mol polyether product) was added slowly, with stirring, and the reaction mixture was stirred at 100° C. for a further 4 hours. Water (941 g) was added and the mixture was allowed to cool to ambient temperature. (AV 36.6 mg KOH/g, on solids).

EXAMPLE 8

Preparation of adduct for use as anodic electrodeposition binder

The procedure of Example 7 was repeated using the polyether product of Example 3 (1717.55 g of a 66.7% solution in 2-n-butoxyethaol, 1 mol polyether product) in place of the polyether product of Example 1. The resulting mixture had AV 35.1 mg KOH/g, on solids.

EXAMPLES 9 and 10

Cathodic electrodeposition

The adducts of Examples 5 and 6, in the form of the respective mixtures obtained in those Examples, were blended with "CYMEL 1141" in binder solids to "CYMEL 1141" weight ratio 70:30, neutralized with an equivalent amount (=1.0) of lactic acid and thinned by gradual addition of demineralized water to a final solids content of 15%.

Electrodeposition was carried out by direct current for electrodeposition time of 0.1 second at 200 V to obtain a coating with a thickness after baking of 4 to 6 μm. The electrodeposition cell comprised a flat stainless steel anode and a flat exchangeable tin plate cathode which were kept 1.0 mm apart by means of insulating spacers. The coated area was a rectangle of 40×50 mm. After electrodeposition, the coated tin plates were rinsed water and cured at 200° C. for 3, 5 or 10 minutes. The coatings were assessed visually for appearance (5: smooth, no bubbles, 4: orange-peel surface, 3: orange-peel, few bubbles, 2: many bubbles) and were evaluated for solvent resistance (number of double rubs with a methylethylketone-moistened cloth necessary to remove the coatings ("MEK rubs")) and sterilization resistance (exposure to water at 121° C. for 90 minutes, assessment on a scale ranging from 5: unaffected, to 0: very heavy blushing).

Results of the above tests are given in Table I.

TABLE I

| Example | 9 | | | 10 | | |
|---|---|---|---|---|---|---|
| Adduct of Example | 5 | | | 6 | | |
| pH of electrodeposition (ED) composition | 3.8 | | | 3.6 | | |
| specific conductivity of ED composition at 23° C. (μS/cm) | 514 | | | 475 | | |
| Stoving time (min.) | 3 | 5 | 10 | 3 | 5 | 10 |
| Film appearance | 5 | 5 | 5 | 5 | 5 | 5 |
| MEK rubs | 45 | >100 | >100 | 45 | >100 | >100 |
| Sterilization resistance | 5 | 5 | 5 | 5 | 5 | 5 |

EXAMPLES 11 AND 12

Anodic electrodeposition

The adducts of Examples 7 and 8, in the form of the respective mixtures obtained in those Examples, were blended with hexamethoxy methyl melamine ("CYMEL 1141") in binder solids to "CYMEL 1141" weight ratio 80:20, neutralized with an equivalent amount (=1.0) of 2-dimethylamino-2-methyl-1-propanol and thinned by gradual addition of demineralized water to final solids content of 15% (Ex. 11) and 12% (Ex. 12).

Electrodeposition was carried out by direct current for electrodeposition time of 0.1 second at 125 V (Ex. 11) and 150 V (Ex. 12) to obtain coatings with a thickness after baking of 4 to 6 µm. The electrodeposition cell comprised a flat stainless steel cathode and a flat exchangeable time plate anode which were kept 1.0 mm apart by means of insulating spacers. The coated area was a rectangle of 40×50 mm. After electrodeposition, the coated tin plates were rinsed with water and cured at 200° C. for 3, 5 or 10 minutes. The coatings were assessed as in Examples 9 and 10.

Results are given in Table II.

TABLE II

| Example | 11 | | | 12 | | |
|---|---|---|---|---|---|---|
| Adduct of Example | 7 | | | 8 | | |
| pH of (ED) composition | 9.4 | | | 9.6 | | |
| specific conductivity of ED composition at 23° C. (µS/cm) | 650 | | | 380 | | |
| Stoving time (min.) | 3 | 5 | 10 | 3 | 5 | 10 |
| Film appearance | 3–4 | 3–4 | 3–4 | 3–4 | 3–4 | 3–4 |
| MEK rubs | 80 | 100 | >100 | 28 | 40 | 60 |
| Sterilization resistance | 5 | 5 | 5 | 5 | 5 | 5 |

EXAMPLES 13 AND 14

Can coating by cathodic electrodeposition

The adduct of Example 5 (1000 g; 67% solids) was blended with "CYMEL 1141" (336 g; 85% solids) i.e., solids weight ratio 70:30), neutralized with an equivalent amount (=1) of lactic acid (43 g of 90% aqueous solution) and thinned with demineralized water (4970 g) to a solids content of 17.5%. The resulting coating composition had pH 3.8 and conductivity $454 \times 10^{-6}$ mhos at 20° C. and contained 6% cosolvent (primarily 2-n-butoxyethanol) (Example 13).

A portion of the resulting composition was diluted with 2-n-butoxyethanol to a cosolvent content of 8% (Example 14).

These compositions were used to coat 330 ml tinplate cans by cathodic electrodeposition. The can formed the cathode of an electrodeposition cell, the anode being a stainless steel member inserted within the can at a substantially uniform separation of 2 millimeters from the can. A potential difference was applied between the can and the anode, for a total time of 240 milliseconds. After electrodeposition the coated can was vigorously rinsed with demineralized water, and the coating was cured by stoving the coated can for 3 minutes at 200° C.

The coating composition of Example 13 when used at 30° C., at voltage 180 volts gave total cured coating weight 160 mg per can, and at voltage 200 volts gave total cured coating weight 200 mg per can, and at 20° C. and at 240 volts gave total cured coating weight 133 mg per can. No trace of coating rupture was observed and the resulting cured coatings were smooth and bubble-free.

The coating composition of Example 14 when used at 25° C., at voltage 180 volts gave total cured coating weight 190 mg per can, at voltage 200 volts gave total cured coating weight 220 mg per can and at 220 volts gave total cured coating weight 290 mg per can. No trace of coating rupture was observed and the resulting cured coatings were smooth and bubble-free.

EXAMPLE 15

Preparation of adduct for use as cathodic electrodeposition binder

A 95% aqueous solution of 2-amino-2-methyl-1-propanol (187.4 g, 2 mol), water (40 g) and 2-n-butoxyethanol (100 g) were heated with stirring to 110° C. A liquid bisphenol-A-derived diglycidyl ether of epoxy molar mass 198 g (396 g) was added over 1 hour, with stirring, followed by addition over 2 hours with stirring of a solution of polyether product prepared as in Example 1 (1638 g; 66.7% solids). The reaction mixture was stirred at 110° C. for a further 4 hours, until reaction was complete.

EXAMPLES 16 AND 17

Can coating by cathodic electrodeposition

The adduct of Example 15 (1500 g) was blended with "CYMEL 1141" (529.4 g), neutralized with lactic acid (66 g) and thinned with demineralized water (7495 g), in similar manner to that of Example 13. The resulting coating composition had a solids content of 15.6%, contained 5.5% cosolvent and had pH 4.7 and conductivity $758 \times 10^{-6}$ mhos at 20° C. (Example 16).

A portion of the resulting composition was diluted with 2-n-butoxyethanol to a cosolvent content of 7.0% (Example 17).

These compositions were used to coat cans by the cathodic electrodeposition process described in Examples 13 and 14.

The coating composition of Example 16 when used at 21° C. at voltage 200 volts gave total cured coating weight 89 mg per can. There was no film rupture and the resulting cured coatings were smooth and bubble-free.

The coating composition of Example 17 when used at 26° C. at voltage 180 volts gave total cured coating weight 106 mg per can. When this voltage was applied for a total time of 400 milliseconds total cured coating weight were in excess of 140 mg per can. In each case, there was no film rupture and the resulting cured coatings were smooth and bubble-free.

What is claimed is:

1. A process for the preparation of a thermosetting resin coating composition suitable for electrodeposition which comprises (A) reacting (1) a polyglycidyl ether having, on average, n epoxy groups per molecule, where $1 < n \leq 2$, prepared by reacting a multifunctional glycidyl novolac resin having, on average, x epoxy groups per molecule, where $x > 2$, with $(x-n)$ moles of a monofunctional alkyl-substituted phenol at a temperature of from about 120° to about 180° C. in the presence of an acid or base catalyst, with (2) an amino compound containing, on average, two amino-hydrogens per molecule or an alkali metal salt of an amino acid in aqueous medium at a temperature from about 100° to about 120° C., and then (B) combining the resultant resinous compounds wih a water soluble cross-linking compound in a weight ratio of from bout 95:5 to about 65:35, before or after neutralization.

2. The process of claim 1 wherein the glycidyl novolac resin has the value $3 \leq x \leq 4$.

3. The process of claim 1 wherein the polyglycidyl ether has the value $1.3 \leq n \leq 2$.

4. The process of claim 1 wherein the monofunctional phenol is a phenol substituted in the para-position by a $C_{4-12}$ alkyl substituent.

5. The process of claim 1 wherein the water soluble cross-linking compound is an aminoplast resin.

6. The process of claim 5 wherein the aminoplast resin is an alkoxylated melamine-formaldehyde resin.

* * * * *